(12) United States Patent
Matsubara et al.

(10) Patent No.: US 8,784,683 B2
(45) Date of Patent: *Jul. 22, 2014

(54) LIQUID CRYSTALLINE POLYESTER COMPOSITION, METHOD OF PRODUCING THE SAME AND MOLDED PRODUCT MANUFACTURED FROM THE SAME

(75) Inventors: Satoshi Matsubara, Nagoya (JP); Hideyuki Umetsu, Nagoya (JP); Takayuki Hase, Nagoya (JP)

(73) Assignee: Toray Industries, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/637,738

(22) PCT Filed: Dec. 14, 2011

(86) PCT No.: PCT/JP2011/006987
§ 371 (c)(1),
(2), (4) Date: Sep. 27, 2012

(87) PCT Pub. No.: WO2012/090411
PCT Pub. Date: Jul. 5, 2012

(65) Prior Publication Data
US 2013/0015400 A1    Jan. 17, 2013

(30) Foreign Application Priority Data
Dec. 28, 2010 (JP) ................. 2010-292446

(51) Int. Cl.
- C09K 19/52 (2006.01)
- C09K 19/54 (2006.01)
- G02F 1/13 (2006.01)
- C09K 19/02 (2006.01)
- C09K 19/00 (2006.01)
- B29B 7/00 (2006.01)
- B29C 45/00 (2006.01)
- C08F 283/00 (2006.01)
- C08G 63/91 (2006.01)
- C08L 67/00 (2006.01)
- B60C 1/00 (2006.01)
- C08K 3/04 (2006.01)

(52) U.S. Cl.
USPC ............... 252/299.01; 252/299.5; 428/1.1; 349/183; 264/328.14; 264/328.16; 525/418; 524/495

(58) Field of Classification Search
USPC .......... 252/299.01, 299.5; 428/1.1; 349/183; 264/328.14, 328.16; 525/418; 524/495
See application file for complete search history.

(56) References Cited

U.S. PATENT DOCUMENTS

| | | |
|---|---|---|
| 2002/0017631 A1 | 2/2002 | Maeda et al. |
| 2009/0197471 A1 | 8/2009 | Fukatsu et al. |
| 2013/0015401 A1* | 1/2013 | Matsubara et al. ........ 252/299.5 |

FOREIGN PATENT DOCUMENTS

| | | |
|---|---|---|
| JP | 11-322910 A | 11/1999 |
| JP | 2001-288342 A | 10/2001 |
| JP | 2007-169379 A | 7/2007 |
| JP | 2008-143996 A | 6/2008 |
| JP | 2009-191088 A | 8/2009 |
| JP | 2009-215530 A | 9/2009 |
| WO | 2008-023839 | 2/2008 |

* cited by examiner

*Primary Examiner* — Geraldina Visconti
(74) *Attorney, Agent, or Firm* — DLA Piper LLP (US)

(57) ABSTRACT

A liquid crystalline polyester composition contains at least 100 parts by weight of liquid crystalline polyester having different structural units and 10 to 100 parts by weight of glass fiber, wherein the glass fiber has a weight-average fiber length (Mw) of 200 to 500 μm, and content of specific glass fiber having fiber length of not less than 1500 μm is 0.1 to 5.0 percent by weight to a total amount of the glass fiber.

12 Claims, 2 Drawing Sheets

LIQUID CRYSTALLINE POLYESTER COMPOSITION, METHOD OF PRODUCING THE SAME AND MOLDED PRODUCT MANUFACTURED FROM THE SAME

RELATED APPLICATIONS

This is a §371 of International Application No. PCT/JP2011/006987, with an international filing date of Dec. 14, 2011 (WO 2012/090411 A1, published Jul. 5, 2012), which is based on Japanese Patent Application No. 2010-292446, filed Dec. 28, 2010, the subject matter of which is incorporated by reference.

TECHNICAL FIELD

This disclosure relates to a liquid crystalline polyester composition, a method of producing the same and a molded product manufactured from the same.

BACKGROUND

In recent years, with increased demand for high-performance plastics, lots of polymers of various novel properties have been developed and come on the market. Liquid crystalline resins having characteristic parallel arrangement of molecular chains and showing optical anisotropy, such as liquid crystalline polyester, have received particular attention, because of their excellent moldability and mechanical properties, and their applications have been expanded to mechanical components and electric and electronic components. In particular, the liquid crystalline resins are favorably used for electric and electronic components requiring the high flowability, such as connectors.

With downsizing and refining the mechanical components and the electric and electronic components, molded products have ultra-thin wall thickness. Liquid crystalline polyester compositions filled with fibrous inorganic fillers have been used with an aim to improve the strength of the product and reduce the anisotropy.

With the aim of improving the weld strength and the surface smoothness of the molded product, for example, the following liquid crystalline resin composition has been proposed (e.g., see JP 2009-215530A). This liquid crystalline resin composition contains 20 to 80 parts by weight of a fibrous filler having the maximum fiber length of not greater than 1000 μm and the weight-average fiber length of not less than 200 μm and not greater than 450 μm, relative to 100 parts by weight of liquid crystalline resin.

With the aim of preventing blister and reducing protrusion of glass fibers from the gate and from the fluid terminals, the following liquid crystalline resin composition has been proposed (e.g., see JP 2009-191088A). This liquid crystalline resin composition contains: (i) 5 to 50 percent by weight of glass fiber having the number-average fiber length of 50 to 120 μm and the content of the fiber length of 20 to 150 μm to be not lower than 80%; and (ii) 95 to 5 percent by weight of liquid crystalline polymer.

To produce favorable mechanical properties and reduce the warpage deformation for asymmetric electronic components, the following liquid crystalline polymer composition has been proposed (e.g., see WO 2008-023839). This liquid crystalline polymer composition is prepared by mixing: (i) a fibrous filler having the average fiber diameter of 5 to 30 μm, the weight-average fiber length of 250 to 350 μm excluding the fiber length of not greater than 10 μm, and the content of the fiber length of not less than 700 μm to be not higher than 5 percent by weight; and (ii) a plate-like filler having the average particle diameter of 0.5 to 200 μm.

Many mechanical components and electric and electronic components include snap-fit elements and screw structures. Recent size reduction and refinement of components requires the high snap-fit property and self-tapping property for materials. The resin compositions disclosed in JP 2009-215530A and JP 2009-191088A, however, have the small content of the glass fiber of long fiber length, which results in the low weld strength, the poor toughness and the insufficient snap-fit property required for components with joints. The resin composition disclosed in WO 2008-023839, on the other hand, has the high degree of breakage of glass fiber, which results in the insufficient self-tapping property, weld strength and snap-fit property required for molded products with screw structures.

It could therefore be helpful to provide a liquid crystalline polyester composition having less variation in flowability that gives a molded product having high snap-fit property, self-tapping property and weld strength.

SUMMARY

We thus provide:

(1) There is provided a liquid crystalline polyester composition, at least containing 100 parts by weight of liquid crystalline polyester having structural units (I), (II), (III), (IV) and (V) shown below and 10 to 100 parts by weight of glass fiber. The glass fiber has a weight-average fiber length (Mw) of 200 to 500 μm. The content of specific glass fiber having fiber length of not less than 1500 μm is 0.1 to 5.0 percent by weight to a total amount of the glass fiber.

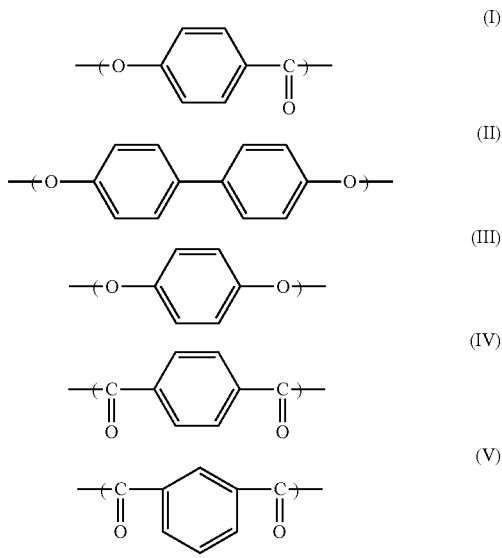

(2) There is provided the liquid crystalline polyester composition described in (1), wherein the glass fiber has a ratio (D90/D10) of 90%-cumulative-frequency fiber length (D90) to 10%-cumulative-frequency fiber length (D10) in the cumulative weight fiber length distribution curve of not greater than 5.0.

In the liquid crystalline polyester composition described in (1), however, the ratio (D90/D10) may be greater than 5.0.

(3) There is provided the liquid crystalline polyester composition described in either (1) or (2), wherein the glass fiber contained in the liquid crystalline polyester composition has a mode of fiber length in a fiber length frequency distribution that is not less than 0.25 times but less than 0.90 times as much as the weight-average fiber length.

In the liquid crystalline polyester composition described in either (1) or (2), however, the mode of fiber length of the glass fiber in the fiber length frequency distribution may be less than 0.25 times as much as the weight-average fiber length or may be not less than 0.90 times as much as the weight-average fiber length.

(4) There is provided the liquid crystalline polyester composition described in any of (1) to (3), wherein content of the structural unit (I) is 65 to 80 mole percent relative to a total amount of the structural units (I), (II) and (III), content of the structural unit (II) is 55 to 85 mole percent relative to a total amount of the structural units (II) and (III), and content of the structural unit (IV) is 50 to 95 mole percent relative to a total amount of the structural units (IV) and (V).

In the liquid crystalline polyester composition described in any of (1) to (3), however, the content of the structural unit (I) may be less than 65 mole percent or may be greater than 80 mole percent relative to the total amount of the structural units (I), (II) and (III). The content of the structural unit (II) may be less than 55 mole percent or may be greater than 85 mole percent relative to the total amount of the structural units (II) and (III). The content of the structural unit (IV) may be less than 50 mole percent or may be greater than 95 mole percent relative to the total amount of the structural units (IV) and (V).

(5) There is provided a method of producing the liquid crystalline polyester composition described in any of (1) to (4). The method melt-kneading at least liquid crystalline polyester having structural units (I), (II), (III), (IV) and (V) shown below and glass fiber by an extruder having a plurality of supply ports. The method supplies the liquid crystalline polyester from a first supply port located on an extruder drive system side, supplies the glass fiber from a second supply port located downstream of the first supply port, and controls melt viscosity of the liquid crystalline polyester at a shear rate of $100 \text{ s}^{-1}$ in a glass fiber supply section to 100 to 5000 Pa·s.

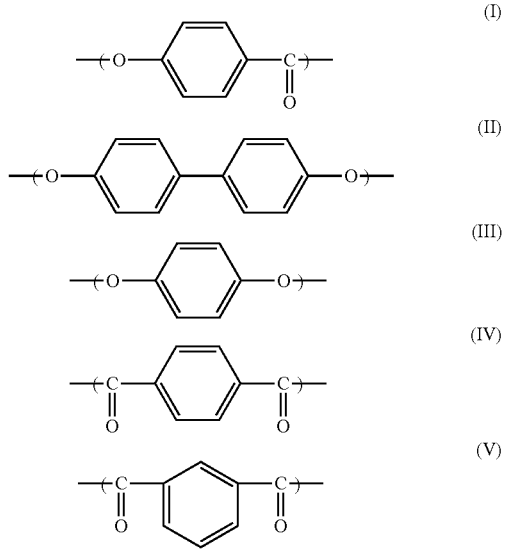

In the method of producing the liquid crystalline polyester composition described in any of (1) to (4), however, the melt viscosity of the liquid crystalline polyester at the shear rate of $100 \text{ s}^{-1}$ in the glass fiber supply section may be less than 100 Pa·s or may be greater than 5000 Pa·s.

(6) There is provided a molded product manufactured by injection molding the liquid crystalline polyester composition described in any of (1) to (4).

The liquid crystalline polyester composition described in any of (1) to (4) may, however, be molded by another method.

(7) There is provided the molded product described in (6), the molded product being a connector.

The molded product described in (6) may, however, be used as a member other than the connector.

The liquid crystalline polyester composition has less variation in flowability. The liquid crystalline polyester composition gives a molded product having excellent snap-fit property, self-tapping property and weld strength. The liquid crystalline polyester composition is favorably used for thin-wall electric and electronic components or mechanical components in complicated shapes and is especially useful for joint components or molded products with screw structures.

DESCRIPTION OF SYMBOLS

Figure 1:
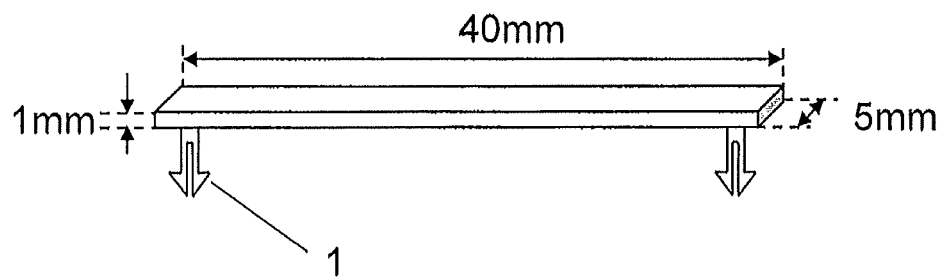
FIG. 1 schematically illustrates a molded product with snap-fit elements used for evaluation of snap-fit property according to an example.

1 Snap-fit element
2 Substrate

DETAILED DESCRIPTION

The liquid crystalline polyester composition contains 10 to 100 parts by weight of glass fiber having a specific fiber length relative to 100 parts by weight of liquid crystalline polyester comprising structural units (I), (II), (III), (IV) and (V) shown below.

The liquid crystalline polyester has structural units selected from the group including, for example, aromatic oxycarbonyl unit, aromatic and/or aliphatic dioxy units, and aromatic and/or aliphatic dicarbonyl units. The liquid crystalline polyester forms an anisotropic molten phase.

The liquid crystalline polyester may have the structural units (I), (II), (III), (IV) and (V) shown below. This liquid crystalline polyester has the low solidification rate and the improved polymer adhesion, thus enhancing the weld strength.

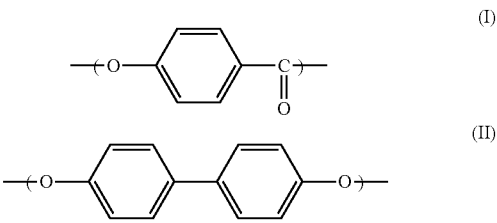

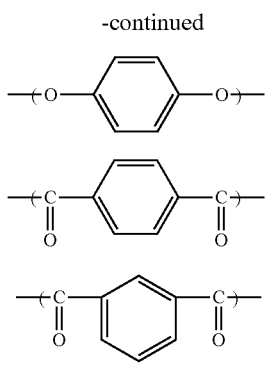

The structural unit (I) represents p-hydroxybenzoic acid-derived structural unit; the structural unit (II) represents 4,4'-dihydroxybiphenyl-derived structural unit; the structural unit (III) represents hydroquinone-derived structural unit; the structural unit (IV) represents terephthalic acid-derived structural unit; and the structural unit (V) represents isophthalic acid-derived structural unit. The structural unit (I) contributes to improving the snap-fit property. The structural units (II) to (V) contribute to enhancing the weld strength.

The content of the structural unit (I) is preferably 65 to 80 mole percent relative to the total amount of the structural units (I), (II) and (III). Specifically for the improved wettability with the glass fiber, the content of the structural unit (I) is more preferably 68 to 78 mole percent relative to the total amount of the structural units (I), (II) and (III).

The content of the structural unit (II) is preferably 55 to 85 mole percent relative to the total amount of the structural units (II) and (III). For the reduced crystallinity to increase the toughness and further improve the self-tapping property, the content of the structural unit (II) is more preferably 55 to 78 mole percent and most preferably 58 to 73 mole percent relative to the total amount of the structural units (II) and (III).

The content of the structural unit (IV) is preferably 50 to 95 mole percent relative to the total amount of the structural units (IV) and (V). For the reduced crystallinity to increase the toughness and further improve the self-tapping property, the content of the structural unit (IV) is more preferably 55 to 90 mole percent and most preferably 60 to 85 mole percent relative to the total amount of the structural units (IV) and (V).

The total amount of the structural units (II) and (III) is preferably equimolar with the total amount of the structural units (IV) and (V). The term "substantially equimolar" herein means that the structural units forming the polymer main chain except the terminal groups are equimolar. Even the non-equimolar composition when including the structural units of the terminal groups may accordingly satisfy the "substantially equimolar" condition. An excess of dicarboxylic acid component or dihydroxy component may be added to control the polymer terminal groups.

The liquid crystalline polyester may be produced by a method equivalent to the known polyester polycondensation method. For example, the following production methods are preferably employed:

(1) method of producing the liquid crystalline polyester by deacetylation polycondensation reaction from p-acetoxybenzoic acid, 4,4'-diacetoxybiphenyl, diacetoxybenzene, terephthalic acid and isophthalic acid;

(2) method of producing the liquid crystalline polyester by deacetylation polycondensation reaction after acylation of phenolic hydroxyl group by reaction of acetic anhydride with p-hydroxybenzoic acid, 4,4'-dihydroxybiphenyl, hydroquinone, terephthalic acid and isophthalic acid;

(3) method of producing the liquid crystalline polyester by dephenolation polycondensation reaction from phenyl p-hydroxybenzoate, 4,4'-dihydroxybiphenyl, hydroquinone, diphenyl terephthalate and diphenyl isophthalate; and (4) method of producing the liquid crystalline polyester by dephenolation polycondensation reaction with addition of aromatic dihydroxy compounds, such as 4,4'-dihydroxybiphenyl and hydroquinone after diphenyl esterification by reaction of specified amounts of diphenyl carbonate with p-hydroxybenzoic acid and aromatic dicarboxylic acids, such as terephthalic acid and isophthalic acid.

Especially preferable is the method of producing the liquid crystalline polyester by deacetylation polycondensation reaction after acylation of phenolic hydroxyl group by reaction of acetic anhydride with p-hydroxybenzoic acid, 4,4'-dihydroxybiphenyl, hydroquinone, terephthalic acid and isophthalic acid. Furthermore the total amount of 4,4'-dihydroxybiphenyl and hydroquinone is preferably equimolar with the total amount of terephthalic acid and isophthalic acid.

The amount of acetic anhydride is preferably not greater than 1.15 equivalents and is more preferably not greater than 1.10 equivalents of the total amount of phenolic hydroxyl groups of p-hydroxybenzoic acid, 4,4'-dihydroxybiphenyl and hydroquinone. The lower limit is preferably not less than 1.0 equivalent.

In the process of producing the liquid crystalline polyester by deacetylation polycondensation reaction, the melt polymerization method may preferably be employed to complete the polycondensation reaction under reduced pressure at a temperature at which the liquid crystalline polyester melts. For example, the following method may be employed. Specified amounts of p-hydroxybenzoic acid, 4,4'-dihydroxybiphenyl, hydroquinone, terephthalic acid, isophthalic acid and acetic anhydride are mixed in a reaction vessel equipped with stirring blades, a distillation pipe and a lower outlet. The mixture is heated with stirring in nitrogen atmosphere for acetylation of the hydroxyl group. The temperature of the reaction mixture is then further raised to the melting temperature the liquid crystalline polyester, and the polycondensation reaction is completed under reduced pressure.

At a temperature at which the resulting polymer melts, the reaction vessel may be pressurized to, for example, about 1.0 kg/cm² (0.1 MPa). The resulting polymer may be discharged in the form of strands from the lower outlet of the reaction vessel. The melt polymerization method is advantageous to produce the homogeneous polymer and preferably gives the excellent polymer with less gas evolution.

The polycondensation reaction of the liquid crystalline polyester proceeds without a catalyst, but a metal compound, such as tin (II) acetate, tetrabutyl titanate, potassium acetate, sodium acetate, antimony trioxide, and metal magnesium may be used.

The contents of the respective structural units in the liquid crystalline polyester are calculable by the following procedure. The liquid crystalline polyester is weighted in an NMR (nuclear magnetic resonance) sample tube, is dissolved in a liquid crystalline polyester-soluble solvent (for example, pentafluorophenol/tetrachloroethane-$d_2$ mixture) and is subjected to $^1$H-NMR spectroscopy. The contents of the respective structural units are calculable from an area ratio of peaks corresponding to the respective structural units.

The melting point (Tm) is determinable with a differential scanning calorimeter by the following procedure. After observation of an endothermic peak temperature (Tm1) in measurement with heating the liquid crystalline polyester at a rate of 40° C./minute from room temperature, the temperature is sequentially maintained at Tm1+20° C. for 5 minutes, then decreased to room temperature at a rate of 20° C./minute, and increased again at a rate of 20° C./minute. An endothermic peak temperature (Tm2) observed during the re-heating process is determined as the melting point (Tm).

The melt viscosity of the liquid crystalline polyester is preferably 1 to 200 Pa·s and more preferably 10 to 200 Pa·s and further more preferably 10 to 100 Pa·s. The melt viscosity is measured with a Koka-type flow tester (constant-load orifice-type flow tester) at a shear rate of 1000/second under the temperature condition of the melting point of the liquid crystalline polyester+10° C.

The liquid crystalline polyester composition may contain 10 to 100 parts by weight of glass fiber relative to 100 parts by weight of the liquid crystalline polyester. The glass fiber content of less than 10 parts by weight has low reinforcing effect, which results in lowering the snap-fit property and the weld strength. The glass fiber content of less than 10 parts by weight also increases a variation in dimensions, thus significantly lowering the self-tapping property. The content of the glass fiber contained in the liquid crystalline polyester composition is preferably not less than 20 parts by weight and is more preferably not less than 30 parts by weight. The glass fiber content of greater than 100 parts by weight, on the other hand, lowers the toughness and makes the resulting resin composition brittle, thus lowering the snap-fit property and the self-tapping property. The glass fiber content of greater than 100 parts by weight also reduces the relative amount of the resin in the composition, thus lowering the weld strength. Additionally, the glass fiber content of greater than 100 parts by weight interferes with the flow and thereby causes a large variation in flowability. The glass fiber content in the liquid crystalline polyester composition is preferably not greater than 90 parts by weight and is more preferably not greater than 80 parts by weight.

In the liquid crystalline polyester composition, it is important to meet the requirements that (i) the glass fiber has weight-average fiber length (Mw) of 200 to 500 μm and (ii) the content of specific glass fiber having the fiber length of not less than 1500 μm is 0.1 to 5.0 percent by weight to the total amount of glass fiber. The weight-average fiber length (Mw) of the glass fiber of less than 200 μm lowers the self-tapping property. The weight-average fiber length (Mw) of the glass fiber is preferably not less than 250 μm and is more preferably not less than 300 μm. The weight-average fiber length (Mw) of the glass fiber of greater than 500 μm, on the other hand, lowers the flowability and causes poor surface appearance. The weight-average fiber length (Mw) of the glass fiber is preferably not greater than 450 μm and is more preferably not greater than 430 μm.

Even when the weight-average fiber length (Mw) of the glass fiber is in the range of 200 to 500 μm, the content of the specific glass fiber having the fiber length of not less than 1500 μm of less than 0.1 percent by weight lowers the snap-fit property and the weld strength. The content of the specific glass fiber having the fiber length of not less than 1500 μm is preferably not less than 0.3 percent by weight and is more preferably not less than 0.5 percent by weight. The content of the specific glass fiber having the fiber length of not less than 1500 μm of greater than 5.0 percent by weight, on the other hand, lowers the toughness and makes the resulting resin composition brittle, which results in lowering the snap-fit property, the self-tapping property and the weld strength. Additionally this content lowers the flowability and causes poor surface appearance. The content of the specific glass fiber having the fiber length of not less than 1500 μm is preferably not greater than 3.0 percent by weight and is more preferably not greater than 2.0 percent by weight.

In the cumulative weight fiber length distribution curve of the glass fiber contained in the liquid crystalline polyester composition, a ratio (D90/D10) of 90%-cumulative-frequency fiber length (D90) to 10%-cumulative-frequency fiber length (D10) is preferably not greater than 5.0. This further improves the self-tapping property and the weld strength of the molded product. From the standpoint of further improved snap-fit property, the ratio (D90/D10) of 90%-cumulative-frequency fiber length (D90) to 10%-cumulative-frequency fiber length (D10) is more preferably not greater than 4.5 and is most preferably not greater than 4.0.

In the fiber length frequency distribution of the glass fiber contained in the liquid crystalline polyester composition, the mode (S) of fiber length is preferably not less than 0.25 times but less than 0.90 times as much as the weight-average fiber length (Mw). From the standpoint of improved weld strength, the mode (S) of fiber length is preferably not less than 0.35 times and is more preferably not less than 0.45 times as much as the weight-average fiber length (Mw). From the standpoint of improved variation in flowability, on the other hand, the mode (S) of fiber length is preferably less than 0.80 times and is more preferably less than 0.70 times as much as the weight-average fiber length (Mw).

The weight-average fiber length (Mw) of the glass fiber and the content of the specific glass fiber having the fiber length of not less than 1500 μm are determinable by the following procedure. Ten grams of pellets composed of a composition containing liquid crystalline polyester and glass fibers are heated in the air at 550° C. for 8 hours for removal of the resin. The remaining glass fibers are observed with an optical microscope at 120-fold magnification, and the fiber length is measured with respect to 1000 or more glass fibers selected at random. The weight-average fiber length (Mw) is given by ($\Sigma$ni·Li$^2$)/($\Sigma$ni·Li), where Li represents the range (division) of the fiber length of the glass fiber and ni is calculated by (the number of glass fibers having the fiber length in the range Li)/(the total number of measured glass fibers). The content of the specific glass fiber having the fiber length of not less than 1500 μm (percent by weight) is given by ($\Sigma$na·La)/($\Sigma$ni·Li)×100, where La represents the range (division) of the fiber length of the glass fiber included in the range of not less than 1500 μm, and na was calculated by (the number of glass fibers having the fiber length in the range La)/(the total number of measured glass fibers).

The ratio (D90/D10) was calculated from the 90%-cumulative frequency fiber length (D90) and the 10%-cumulative frequency fiber length (D10) in the cumulative weight fiber length distribution curve of the glass fiber.

The mode (S) is read from the fiber length frequency distribution. A ratio (S/Mw) was calculated from the mode (S) and the weight-average fiber length (Mw).

The liquid crystalline polyester composition may contain fibrous filler other than the glass fiber or another type of filler other than the fibrous filler in a specific range that does not damage the composition. The fibrous filler may be, for example, carbon fiber, aromatic polyamide fiber, potassium titanium fiber, plaster fiber, brass fiber, stainless steel fiber, steel fiber, ceramic fiber, boron whisker fiber or asbestos fiber. Another type of filler other than the fibrous filler may be the powdery, granular or plate-like inorganic filler, such as talc, graphite, calcium carbonate, glass bead, glass microballoon, clay, wollastonite, titanium oxide or molybdenum disulfide. Two or more of these fillers may be used in combination.

The liquid crystalline polyester composition may additionally contain any of the following general additives and other thermoplastic resins in a specific range that does not damage the composition to provide specific properties: antioxidants and heat stabilizers (e.g., hindered phenol, hydroquinone, phosphites and their substitutes), UV absorbers (e.g., resorcinol, salicylate, benzotriazole and benzophenone), lubricants and mold release agents (e.g., montanic acid and its salts, its esters and its half esters, stearyl alcohol, stearamide and polyethylene wax), coloring agents including dyes (e.g., Nitrosine) and pigments (e.g., cadmium sulfide, phthalocyanine and carbon black), plasticizers and antistatic agents.

The liquid crystalline polyester composition may be obtained, for example, by melt-kneading the liquid crystalline polyester, the glass fiber and the other components as needed basis. Melt-kneading may be performed at the temperature of 200 to 350° C., for example, with a Banbury mixer, a rubber roller, a kneader, a single-screw extruder or a twin-screw extruder. In order to knead the glass fiber homogeneously with high dispersibility, the extruder is preferable, the twin-screw extruder is more preferable, and the twin-screw extruder with an intermediate supply port is further more preferable.

The following methods, for example, may be employed to control the weight-average fiber length (Mw) of the glass fiber contained in the liquid crystalline polyester composition and the content of the specific glass fiber having the fiber length of not less than 1500 μm to the desired ranges described above. More specifically, one available method may blend glass fibers of different fiber lengths and supply the blended glass fibers to the extruder. Another available method may supply one type of such glass fibers together with the liquid crystalline polyester from a supply port located on the extruder drive system side, while supplying the other type of the glass fibers from an intermediate supply port. The glass fibers of different fiber lengths may be, for example, a combination of milled fiber and glass fiber and more specifically a combination of the milled fiber having the weight-average fiber length (Mw) of 30 to 80 μm and the chopped strand having the average cut length of 3 to 4 mm.

Another available method may blend pellets of the liquid crystalline polyester composition containing the milled fibers with pellets of the liquid crystalline polyester composition filled with the chopped strand glass fibers and supply the blended pellets to the extruder. Yet another available method may supply one type of such pellets together with the liquid crystalline polyester from the supply port located on the extruder drive system side, while supplying the other type of the pellets from the intermediate supply port.

Other available methods include a method of adjusting the degree of breakage of glass fiber by screw arrangement and a method of adjusting the degree of breakage of glass fiber by controlling the shear force applied to the glass fiber. The shear force may be controlled, for example, by adjusting the screw rotation speed or the cylinder temperature to regulate the melt viscosity of the molten resin.

The shear rate in the extruder is generally about 1000 to 10000 $s^{-1}$. In the extruder with the intermediate supply port, the zone including the intermediate supply port is open at the connection between the extruder and the feeder, so that the shear rate is estimated to be about 100 $s^{-1}$. Accordingly, when the glass fiber is supplied from the intermediate supply port, the important factor is the melt viscosity of the liquid crystalline polyester at the shear rate of 100 $s^{-1}$.

A preferable procedure may melt-knead the liquid crystalline polyester having the structural units (I), (II), (III), (IV) and (V) described above and the glass fiber with the extruder having a plurality of supply ports. In the course of melt-kneading, the preferable procedure may supply the liquid crystalline polyester from a first supply port located on the extruder drive system side, while supplying the glass fiber from a second supply port located downstream of the first supply port. The melt viscosity of the liquid crystalline polyester in the glass fiber supply section at the shear rate of 100 $s^{-1}$ is preferably 100 to 5000 Pa·s. Setting the melt viscosity of the liquid crystalline polyester in the glass fiber supply section at the shear rate of 100 $s^{-1}$ to be not lower than 100 Pa·s ensures adequate breakage of the glass fiber to improve the flowability and the surface appearance of the resulting molded product. Such setting enables the weight-average fiber length (Mw) of the glass fiber contained in the resulting liquid crystalline polyester composition to be readily controlled respectively to be not greater than 500 μm and the content of the specific glass fiber having the fiber length of not less than 1500 μm to be not higher than 5.0 percent by weight. The melt viscosity of the liquid crystalline polyester in the glass fiber supply section at the shear rate of 100 $s^{-1}$ is more preferably not lower than 200 Pa·s and further more preferably not lower than 300 Pa·s. Setting the melt viscosity of the liquid crystalline polyester in the glass fiber supply section at the shear rate of 100 $s^{-1}$ to be not higher than 5000 Pa·s, on the other hand, adequately controls the degree of breakage of the glass fiber. Such setting enables the weight-average fiber length (Mw) of the glass fiber contained in the resulting liquid crystalline polyester composition to be readily controlled respectively to be not less than 200 μm and the content of the specific glass fiber having the fiber length of not less than 1500 μm to be not lower than 0.1 percent by weight. This further improves the snap-fit property and the weld strength of the resulting molded product. The melt viscosity of the liquid crystalline polyester in the glass fiber supply section at the shear rate of 100 $s^{-1}$ is preferably not higher than 4000 Pa·s and more preferably not higher than 3000 Pa·s.

Available methods of controlling the melt viscosity of the liquid crystalline polyester in the glass fiber supply section at the shear rate of 100 $s^{-1}$ include, for example, a method of changing the molecular weight of the liquid crystalline polyester material and a method of changing the temperature of the glass fiber supply section. From the standpoint of easy adjustment of the fiber length of the glass fiber to the desired range described above, the temperature of the glass fiber supply section is preferably in the range of the melting point of the liquid crystalline polyester −40° C. to the melting point −10° C. and more preferably in the range of the melting point −35° C. to the melting point −15° C.

The glass fiber used as the material for melt-kneading is preferably glass fiber having the average-weight fiber length (Mw) of 300 to 3500 μm. Melt-kneading the glass fiber having the average-weight fiber length (Mw) of not less than 300 μm has the high reinforcement effect on the molded product and further improves the snap-fit property, the self-tapping property and the weld strength. The weight-average fiber length (Mw) is more preferably not less than 400 μm and further more preferably not less than 500 μm. Melt-kneading the glass fiber having the average-weight fiber length (Mw) of not greater than 3500 μm, on the other hand, enables the content of the specific glass fiber having the fiber length of not less than 1500 μm in the liquid crystalline polyester composition to be readily controlled to be not greater than 5.0 percent by weight. This further improves the snap-fit property, the self-tapping property and the weld strength of the molded product.

The contents of the glass fiber and the other additives contained in the liquid crystalline polyester composition obtained by the above process are generally equal to the amounts added for production of the liquid crystalline polyester composition.

The liquid crystalline polyester composition may be formed to various molded products by any of known molding methods. The preferable molding method is injection molding the liquid crystalline polyester composition because of its excellent thin-wall flowability.

The resulting molded product has the excellent snap-fit property and the improved tapping strength and weld strength and is thus favorably used for composite molded products with metals. Concrete examples of composite molded products with metals include electric and electronic components, such as various gears, various casings, sensors, LED components, liquid crystal backlight bobbins, connectors, sockets, resistors, relay cases, relay spools and bases, switches, coil bobbins, capacitors, variable capacitor cases, optical pickups, oscillators, various terminal strips and boards, transformers, plugs, printed circuit boards, tuners, speakers, microphones, headphones, small motors, magnetic head bases, power modules, housings, semiconductors, liquid crystal display components, FDD carriages, FDD chassis, HDD components, motor brush holders, parabola antennas, and computer components; domestic and office electric appliance components, such as video tape recorder components, TV set components (plasma, organic EL and liquid crystal), irons, hair dryers, rice cooker components, microwave oven components, acoustic components, audio equipment components for audios, laserdiscs and compact disks, lighting components, refrigerator components, and air conditioner components; optical equipment and precision machine components, such as office computer components, telephone components, facsimile components, copy machine components, cleaning jigs, various bearings including oilless bearings, stern bearings and submerged bearings, motor components, machine components for lighters and typewriters, microscopes, binoculars, cameras and watches; and automobile and vehicle components, such as alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, fuel tanks, brake hoses, air conditioner refrigerant tubes, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for aid conditioners, motor insulators for air conditioners, hot air flow control valves, brush holders for radiator motors, water pump impellers, turbine vanes, wiper motor components, distributors, starter switches, starter relays, transmission wire harnesses, windshield washer nozzles, air conditioner panel switch plates, fuel solenoid valve coils, fuse connectors, ECU connectors, horn terminals, electric component insulators, step motor rotors, lamp sockets, lamp reflectors, lamp housings, brake pistons, solenoid bobbins, engine oil filters and ignition cases. Film applications of the composite molded product include, films for magnetic recording media. Sheet applications include, door trim, shock-absorbing materials for the bumper and the side frame, seat materials, and pillars. Because of its excellent surface appearance, the composite molded product is favorably applicable to slide components, such as camera module components, optical pickup lens holders and auto focus camera lens modules.

As the applications requiring the snap-fit property and the self-tapping property, this molded product is especially useful for connectors, sockets, relay cases, variable capacitor cases, optical pickups, motor brush holders, radiator motor brush holders, casings, starter relays, fuse connectors, ECU connectors, lamp sockets, lamp reflectors, and optical pickup lens holders, among the above.

This molded product is not restricted to the composite molded products with metals described above but is effectively useful for film applications, such as photo films, capacitor films, electrical insulating films, wrapping films, drawing films, and ribbon films and sheet applications, such as car interior ceiling, pad materials for the instrument panel and sound absorbing pads for the hood back.

EXAMPLES

Advantageous effects are described more in detail with reference to examples.

The composition analysis and the property evaluation of the liquid crystalline polyester were performed by the following methods:

(1) Composition Analysis of Liquid Crystalline Polyester

Composition analysis of the liquid crystalline polyester was performed by $^1$H-nuclear magnetic resonance spectroscopy ($^1$H-NMR). The liquid crystalline polyester of 50 mg was weighed in an NMR sample tube, was dissolved in 800 µl of a solvent (pentafluorophenol/1,1,2,2,-tetrachloroethane-$d_2$=65/35 w/w % mixture), and was subjected to $^1$H-NMR spectroscopy under the conditions of the spectral frequency of 500 MHz and the temperature of 80° C. with UNITY INOVA 500 NMR spectrometer (manufactured by Varian, Inc). The composition of the liquid crystalline polyester was analyzed from the ratio of the areas of peaks corresponding to the respective structural units observed in the spectral range of 7 to 9.5 ppm.

(2) Measurement of Melting Points (Tm) of Liquid Crystalline Polyester and Liquid Crystalline Polyester Composition The melting points (Tm) of the liquid crystalline polyester and the liquid crystalline polyester composition were measured by the following method with differential scanning calorimeter DSC-7 (manufactured by PerkinElmer, Inc). After observation of an endothermic peak temperature (Tm1) in measurement with heating the liquid crystalline polyester or the liquid crystalline polyester composition at a rate of 40° C./minute from room temperature, the temperature was sequentially maintained at Tm1+20° C. for 5 minutes, was then decreased to room temperature at a rate of 20° C./minute, and was increased again at a rate of 20° C./minute. An endothermic peak temperature (Tm2) observed during the re-heating process at the rate of 20° C./minute was determined as the melting point (Tm).

(3) Measurement of Melt Viscosity of Liquid Crystalline Polyester

The melt viscosity was measured under the conditions of the temperature set to the melting point of the liquid crystalline polyester+10° C. and the shear rate of 1000/s by Koka-type flow tester CFT-500D (orifice: 0.5φ×10 mm) (manufactured by Shimadzu Corporation).

The following shows liquid crystalline polyesters and glass fibers used in respective Examples and Comparative Examples.

(A) Liquid Crystalline Polyester

Reference Example 1

Synthesis of Liquid Crystalline Polyester (A-1)

In a 5 L reaction vessel with stirring blades and a distillation pipe, 870 grams (6.30 moles) of p-hydroxybenzoic acid, 327 grams (1.89 moles) of 4,4'-dihydroxybiphenyl, 89 grams (0.81 moles) of hydroquinone, 292 grams (1.76 moles) of terephthalic acid, 157 grams (0.95 moles) of isophthalic acid and 1367 grams of acetic anhydride (1.03 equivalents of the total amount of phenolic hydroxyl group) were mixed, were reacted with stirring in nitrogen atmosphere at 145° C. for 2 hours and were then heated to 320° C. in 4 hours. With keeping the polymerization temperature at 320° C., the reaction vessel was depressurized to 1.0 mmHg (133 Pa) in 1.0 hour and the reaction further proceeded for another 90 minutes. The polycondensation was terminated when the torque required for stiffing reached 15 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-1).

This liquid crystalline polyester (A-1) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). This liquid crystalline polyester (A-1) contained 70 mole percent of p-oxybenzoate unit (structural unit (I)) relative to the total amount of p-oxybenzoate unit (structural unit (I)), 4,4'-dioxybiphenyl unit (structural unit (II)) and 1,4-dioxybenzene unit (structural unit (III)). This liquid crystalline polyester (A-1) contained 70 mole percent of 4,4'-dioxybiphenyl unit (structural unit (II)) relative to the total amount of 4,4'-dioxybiphenyl unit (structural unit (II)) and 1,4-dioxybenzene unit (structural unit (III)). This liquid crystalline polyester (A-1) contained 65 mole percent of terephthalate unit (structural unit (IV)) relative to the total amount of terephthalate unit (structural unit (IV)) and isophthalate unit (structural unit (V)). The melting point (Tm) of this liquid crystalline polyester (A-1) was 314° C. The melt viscosity measured at the temperature of 324° C. and the shear rate of 1000/s with the Koka-type flow tester (orifice of 0.5ϕ×10 mm) was 20 Pa·s.

Reference Example 2

Synthesis of Liquid Crystalline Polyester (A-2)

In a 5 L reaction vessel with stirring blades and a distillation pipe, 1129 grams (8.18 moles) of p-hydroxybenzoic acid, 267 grams (1.54 moles) of 4,4'-dihydroxybiphenyl, 40 grams (0.36 moles) of hydroquinone, 134 grams (0.81 moles) of terephthalic acid, 165 grams (1.00 moles) of isophthalic acid and 1310 grams of acetic anhydride (1.09 equivalents of the total amount of phenolic hydroxyl group) were mixed, were reacted with stirring in nitrogen atmosphere at 145° C. for 1 hour and were then heated to 360° C. in 4 hours. With keeping the polymerization temperature at 360° C., the reaction vessel was depressurized to 1.0 mmHg (133 Pa) in 1.0 hour and the reaction further proceeded for another 90 minutes. The polycondensation was terminated when the torque required for stirring reached 10 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-2).

This liquid crystalline polyester (A-2) had p-oxybenzoate unit (structural unit (I)), 4,4'-dioxybiphenyl unit (structural unit (II)), 1,4-dioxybenzene unit (structural unit (III)), terephthalate unit (structural unit (IV)) and isophthalate unit (structural unit (V)). This liquid crystalline polyester (A-2) contained 82 mole percent of p-oxybenzoate unit (structural unit (I)) relative to the total amount of p-oxybenzoate unit (structural unit (I)), 4,4'-dioxybiphenyl unit (structural unit (II)) and 1,4-dioxybenzene unit (structural unit (III)). This liquid crystalline polyester (A-2) contained 80 mole percent of 4,4'-dioxybiphenyl unit (structural unit (II)) relative to the total amount of 4,4'-dioxybiphenyl unit (structural unit (II)) and 1,4-dioxybenzene unit (structural unit (III)). This liquid crystalline polyester (A-2) contained 45 mole percent of terephthalate unit (structural unit (IV)) relative to the total amount of terephthalate unit (structural unit (IV)) and isophthalate unit (structural unit (V)). The melting point (Tm) of this liquid crystalline polyester (A-2) was 340° C. The melt viscosity measured at the temperature of 350° C. and the shear rate of 1000/s with the Koka-type flow tester (orifice of 0.5 4×10 mm) was 32 Pa·s.

Reference Example 3

Synthesis of Liquid Crystalline Polyester (A-3)

In a polymerization vessel, 994 grams (7.20 moles) of p-hydroxybenzoic acid, 126 grams (0.68 moles) of 4,4'-dihydroxybiphenyl, 112 grams (0.68 moles) of terephthalic acid, 159 grams (1.13 moles) of polyethylene terephthalate having the intrinsic viscosity of about 0.6 dl/g and 960 grams of acetic anhydride (1.10 equivalents of the total amount of phenolic hydroxyl group) were mixed, were reacted for 3 hours with stirring in nitrogen atmosphere with heating to 150° C. The reaction mixture was subsequently heated from 150° C. to 250° C. in 2 hours and further heated from 250° C. to 330° C. in 1.5 hours, was subjected to pressure reduction to 1.0 mmHg (133 Pa) at 325° C. in 1.5 hours, and was further stirred for 0.25 hours. The polycondensation was terminated when the torque required for stirring reached 12 kg·cm. The reaction vessel was then pressurized to 1.0 kg/cm² (0.1 MPa), and the polymer was formed in strands through nozzles each having a circular outlet of 10 mm in diameter and was pelletized with a cutter to the liquid crystalline polyester (A-3).

This liquid crystalline polyester had 66.7 mole percent of p-oxybenzoate unit (structural unit (I)), 6.3 mole percent of 4,4'-dioxybiphenyl unit (structural unit (II)), 10.4 mole percent of ethylenedioxy unit and 16.6 mole percent of terephthalate unit (structural unit (IV)) and the melting point (Tm) of 314° C. The melt viscosity measured at the temperature of 324° C. and the shear rate of 1000/s with the Koka-type flow tester (orifice of 0.5ϕ×10 mm) was 25 Pa·s.

Reference Example 4

Synthesis of Liquid Crystalline Polyester (A-4)

According to JP S54-77691A, in a reaction vessel with stirring blades and a distillation pipe, 921 parts by weight of p-acetoxybenzoic acid and 435 parts by weight of 6-acetoxynaphthoic acid were mixed and polycondensated. The resulting liquid crystalline polyester (A-4) had 57 mole equivalents of p-acetoxybenzoic acid-derived structural unit (structural unit (I)) and 22 mole equivalents of 6-acetoxynaphthoic acid-derived structural unit and the melting point (Tm) of 283° C. The melt viscosity measured at the temperature of 293° C. and the shear rate of 1000/s with the Koka-type flow tester (orifice of 0.5ϕ×10 mm) was 30 Pa·s (B) Glass Fiber (B-1) "chopped strand ECS03 T-747H" manufactured by Nippon Electric Glass Co., Ltd. (number-average fiber length of 3.0 mm, number-average fiber diameter of 10.5 μm);

(B-2) "chopped strand CS 3DE-256S" manufactured by Nitto Boseki Co., Ltd. (number-average fiber length of 3.0 mm, number-average fiber diameter of 6.5 μm); and (B-3) "milled fiber EPG40M-10A" manufactured by Nippon Electric Glass Co., Ltd. (number-average fiber length of 40 μm, number-average fiber diameter of 9 μm).

The properties were evaluated by the following methods:

(1) Glass Fiber Length in Liquid Crystalline Polyester Composition

Ten grams of pellets of the liquid crystalline polyester compositions obtained in respective Examples and Comparative Examples were heated in the air at 550° C. for 8 hours for removal of the resin. The remaining glass fibers were observed with an optical microscope at 120-fold magnification, and the fiber length was measured at 120-fold magnification with respect to 1000 or more glass fibers selected at random. The weight-average fiber length (Mw) is given by (Σni·Li²)/(Σni·Li), where Li represents the range (division) of the fiber length of the glass fiber and ni is calculated by (the number of glass fibers having the fiber length in the range Li)/(the total number of measured glass fibers). The content of the specific glass fiber having the fiber length of not less than 1500 μm (percent by weight) is given by (Σna·La)/(Σni·Li)×100, where La represents the range (division) of the fiber length of the glass fiber included in the range of not less than 1500 μm, and na is calculated by (the number of glass fibers having the fiber length in the range La)/(the total number of measured glass fibers). The ratio (D90/D10) was obtained from the 90%-cumulative frequency fiber length (D90) and the 10%-cumulative frequency fiber length (D10) in the cumulative weight fiber length distribution curve of the glass fiber.

The mode (S) is read from the fiber length frequency distribution. A ratio (S/Mw) was calculated from the mode (S) and the weight-average fiber length (Mw).

(2) Snap-Fit Property

Figure 2:
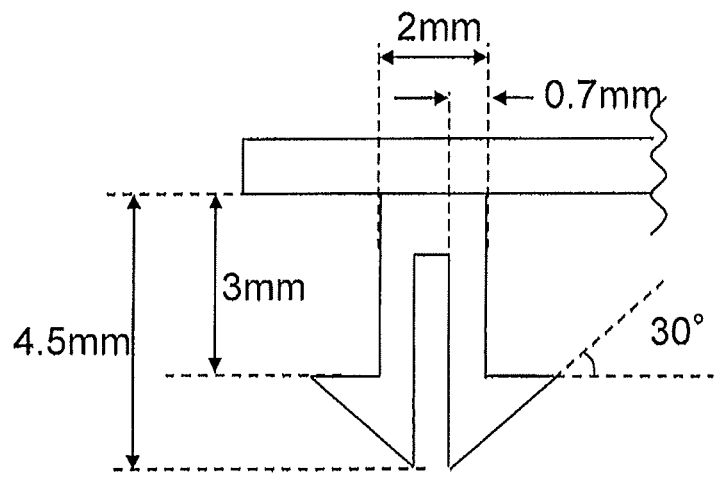
FIG. 2 is an enlarged view (front view) of the snap-fit element shown in FIG. 1.
Figure 3:
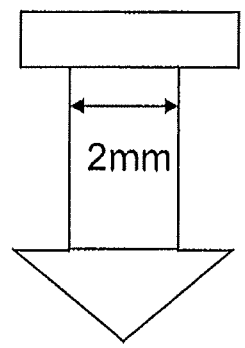
FIG. 3 is an enlarged view (side view) of the snap-fit element shown in FIG. 1.
Figure 4:
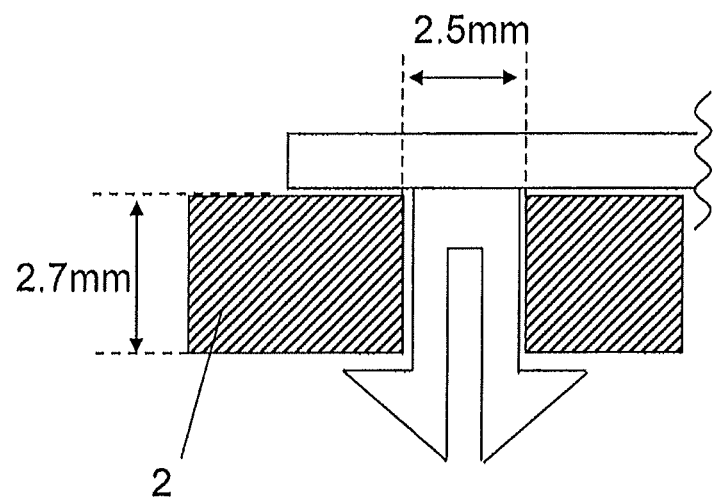
FIG. 4 schematically illustrates a state in which the molded product with the snap-fit elements used for evaluation of the snap-fit property according to the example is attached to a substrate.

Each of the liquid crystalline polyester compositions obtained in respective Examples and Comparative Examples was injection molded to a molded product by FANUC ROBOSHOT α-30C (manufactured by FANUC Corporation). The conditions of the injection molding were the cylinder temperature set to the melting point of the liquid crystalline polyester composition+10° C. and the die temperature of 90° C. A molded product having snap-fit elements 1 shown in FIG. 1 was obtained by the injection molding. FIGS. 2 and 3 are enlarged views of the snap-fit element 1. Attachment and detachment of twenty molded products to and from a substrate as shown in FIG. 4 were repeated ten times, and the number of broken snap-fit elements was counted.

(3) Self-Tapping Property

Each of the liquid crystalline polyester compositions obtained in respective Examples and Comparative Examples was injection molded to a slide base (chassis) for optical component by Sumitomo SG-75 MIII (manufactured by Sumitomo Heavy Industries, Ltd). The conditions of the injection molding were the cylinder temperature set to the melting point of the liquid crystalline polyester composition+ 10° C. and the die temperature of 90° C. The slide base (chassis) for optical component (molded product including a flat plate of 30 mm×30 mm×3 mm in thickness with two screw holes of 1.0 mm in inner diameter and a vertical wall of 5 mm in height×1 mm in thickness surrounding the periphery of the flat plate) was obtained by the injection molding. Tapping screws (BIT SPH 1.2×3.0 as-rolled end) were inserted into the screw holes of the molded product with a round dial gauge torque screw driver (Kanon Clutch Release Torque Screw Driver 1.5LTDK manufactured by NAKAMURA MFG. CO., LTD.), and the molded product was evaluated for the driving torque (minimum torque to fully tighten the screw) and the stripping torque (minimum torque to distort and loosen the inside of the molded product). The greater difference between the driving torque and the stripping torque indicates the better self-tapping property.

(4) Weld Strength

Each of the liquid crystalline polyester compositions obtained in respective Examples and Comparative Examples was molded to an ASTM No. 4 dumbbell by using FANUC ROBOSHOT α-30C (manufactured by FANUC Corporation) as the molding machine and a weld die having gates on both dumbbell ends as the die. The bending strength of the molded dumbbell was measured in conformity with ASTM D790.

(5) Variation in Flowability

Each of the liquid crystalline polyester compositions obtained in respective Examples and Comparative Examples was molded by FANUC ROBOSHOT α-30C (manufactured by FANUC Corporation), The die used was capable of simultaneously molding a molded product of 12.7 mm in width× 100 mm in length×0.3 mm in thickness and a molded product of 12.7 mm in width×100 mm in length×0.5 mm in thickness. The conditions of the molding were the cylinder temperature set to the melting point Tm of the liquid crystalline polyester composition+10° C. and the die temperature of 90° C. The flow length in a cavity of 12.7 mm in width×0.3 mm in thickness was measured under the molding condition that a molded product of 12.7 mm in width×0.5 mm in thickness was moldable to the length of 100 mm. Twenty shots of such molding were repeated, and the difference between the maximum flow length and the minimum flow length among the 20 shots were measured. The smaller difference between the maximum flow length and the minimum flow length indicates the less variation in flowability.

Examples 1 to 4 and 8 and Comparative Examples 1, 2 and 6

In a TEM35B twin-screw extruder (intermeshed co-rotation) with cylinders C1 (main feeder-side heater) to C6 (die-side heater) manufactured by TOSHIBA MACHINE CO., LTD., an intermediate supply port was placed in the cylinder C3 and a vacuum vent was placed in the cylinder C5. By using a screw arrangement with kneading blocks built in the cylinders C2 and C4, the liquid crystalline polyester (A) shown in Table 1, i.e., (A-1), was added from the main feeder (supply port 1), while the glass fiber (B) was added from the intermediate supply port (supply port 2). The mixture was then melt-kneaded under the conditions of the glass fiber supply zone temperature of 284° C., the other zone temperature of 324° C. and the screw rotation speed of 250 rpm, and was formed to pellets with a strand cutter. The measured melt viscosity of the liquid crystalline polyester (A-1) was 1187 Pa·s at the shear rate of 100 s⁻¹ with the Koka-type flow tester (orifice of 0.5φ×10 mm) after the temperature was kept at 334° C. for 3 minutes and was then decreased to 284° C. For this reason, the melt viscosity of the liquid crystalline polyester at the shear rate of 100 s$^{-1}$ in the glass fiber supply zone was thus estimated to be 1187 Pa·s.

The obtained pellets were dried with hot air and were evaluated for the snap-fit property, the self-tapping property, the weld strength and the variation in flowability by the methods described above. The results of evaluation are shown in Table 1.

Example 5

Pellets were obtained in the same manner as Example 1, except that the liquid crystalline polyester (A) was changed to the liquid crystalline polyester (A-2) and that the conditions of melt-kneading were the glass fiber supply zone temperature of 310° C., the other zone temperature of 350° C. and the screw rotation speed of 250 rpm. The obtained pellets were evaluated for the snap-fit property, the self-tapping property, the weld strength and the variation in flowability. The melt viscosity of the liquid crystalline polyester (A-2) was measured at the shear rate of 100 s$^{-1}$ with the Koka-type flow tester (orifice of 0.5φ×10 mm) after the temperature was kept at 360° C. for 3 minutes and was then decreased to 310° C. The measured viscosity was 683 Pa·s.

Examples 6 and 9

Pellets were obtained in the same manner as Example 1 or Example 2, except that the conditions of melt-kneading were the glass fiber supply zone temperature of 304° C., the other zone temperature of 324° C. and the screw rotation speed of 250 rpm. The obtained pellets were evaluated for the snap-fit property, the self-tapping property, the weld strength and the variation in flowability. The melt viscosity of the liquid crystalline polyester (A-1) was measured at the shear rate of 100 s$^{-1}$ with the Koka-type flow tester (orifice of 0.5φ×10 mm) after the temperature was kept at 334° C. for 3 minutes and was then decreased to 304° C. The measured viscosity was 286 Pa·s. For this reason, the melt viscosity of the liquid crystalline polyester at the shear rate of 100 s$^{-1}$ in the glass fiber supply zone was thus estimated to be 286 Pa·s.

Example 7

Pellets were obtained in the same manner as Example 1, except that the conditions of melt-kneading were the glass fiber supply zone temperature of 274° C., the other zone temperature of 324° C. and the screw rotation speed of 250 rpm. The obtained pellets were evaluated for the snap-fit property, the self-tapping property, the weld strength and the variation in flowability. The melt viscosity of the liquid crystalline polyester (A-1) was measured at the shear rate of 100 s$^{-1}$ with the Koka-type flow tester (orifice of 0.5φ×10 mm) after the temperature was kept at 334° C. for 3 minutes and was then decreased to 274° C. The measured viscosity was 2022 Pa·s. For this reason, the melt viscosity of the liquid crystalline polyester at the shear rate of 100 s$^{-1}$ in the glass fiber supply zone was thus estimated to be 2022 Pa·s.

Comparative Example 3

Pellets were obtained in the same manner as Example 1, except that the liquid crystalline polyester (A) was changed to the liquid crystalline polyester (A-3) and that the conditions of melt-kneading were the glass fiber supply zone temperature of 334° C., the other zone temperature of 324° C. and the screw rotation speed of 250 rpm. The obtained pellets were evaluated for the snap-fit property, the self-tapping property, the weld strength and the variation in flowability. The melt viscosity of the liquid crystalline polyester (A-3) was measured at the shear rate of 100 s$^{-1}$ with the Koka-type flow tester (orifice of 0.5 4×10 mm) after the temperature was kept at 334° C. for 3 minutes, The measured viscosity was 1263 Pa·s.

Comparative Example 4

Pellets were obtained in the same manner as Example 2, except that the liquid crystalline polyester (A) was changed to the liquid crystalline polyester (A-3) and that the conditions of melt-kneading were the cylinder temperature wholly set to 324° C. and the screw rotation speed of 250 rpm. The obtained pellets were evaluated for the snap-fit property, the self-tapping property, the weld strength and the variation in flowability. The melt viscosity of the liquid crystalline polyester (A-3) was measured at the shear rate of 100 s$^{-1}$ with the Koka-type flow tester (orifice of 0.5φ×10 mm) after the temperature was kept at 334° C. for 3 minutes and was then decreased to 324° C. The measured viscosity was 2080 Pa·s.

Comparative Example 5

Pellets were obtained in the same manner as Example 1, except that the liquid crystalline polyester (A) was changed to the liquid crystalline polyester (A-4) and that the conditions of melt-kneading were the glass fiber supply zone temperature of 253° C., the other zone temperature of 293° C. and the screw rotation speed of 250 rpm. The obtained pellets were evaluated for the snap-fit property, the self-tapping property, the weld strength and the variation in flowability. The melt viscosity of the liquid crystalline polyester (A-4) was measured at the shear rate of 100 s$^{-1}$ with the Koka-type flow tester (orifice of 0.5φ×10 mm) after the temperature was kept at 303° C. for 3 minutes and was then decreased to 253° C. The measured viscosity was 702 Pa·s.

Comparative Example 7

Pellets were obtained in the same manner as Example 1, except that the conditions of melt-kneading were the glass fiber supply zone temperature of 334° C., the other zone temperature of 324° C. and the screw rotation speed of 250 rpm. The obtained pellets were evaluated for the snap-fit property, the self-tapping property, the weld strength and the variation in flowability. The melt viscosity of the liquid crystalline polyester (A-1) was measured at the shear rate of 100 s$^{-1}$ with the Koka-type flow tester (orifice of 0.5φ×10 mm) after the temperature was kept at 334° C. for 3 minutes. The measured viscosity was 48 Pa·s.

Comparative Example 8

Pellets were obtained in the same manner as Example 1, except that the conditions of melt-kneading were the glass fiber supply zone temperature of 274° C., the other zone temperature of 324° C. and the screw rotation speed of 250 rpm. The obtained pellets were evaluated for the snap-fit property, the self-tapping property, the weld strength and the variation in flowability. The melt viscosity of the liquid crystalline polyester (A-1) was measured at the shear rate of 100 s$^{-1}$ with the Koka-type flow tester (orifice of 0.5φ×10 mm) after the temperature was kept at 334° C. for 3 minutes and was then decreased to 274° C. The measured viscosity was 4093 Pa·s.

TABLE 1

| | (A) liquid Crystalline Polyester (100 parts by weight) | (B) Glass Fiber (parts by weight) | | | Melt Viscosity of Liquid Crystalline Polyester in Glass Fiber Supply Section | Glass Fiber Length | | | | |
|---|---|---|---|---|---|---|---|---|---|---|
| | | | | | | Weight-Ave. Fiber Length (Mw) | Content of ≥1500 μm | D90/ D10 | Mode (S) | S/Mw |
| | | B-1 | B-2 | B-3 | Pa·s | μm | wt % | — | μm | — |
| EX 1 | A-1 | 50 | 0 | 0 | 1187 | 368 | 1.2 | 3.7 | 213 | 0.57 |
| EX 2 | A-1 | 0 | 50 | 0 | 1187 | 309 | 0.6 | 3.5 | 238 | 0.77 |
| EX 3 | A-1 | 25 | 0 | 0 | 1187 | 413 | 1.8 | 4.2 | 213 | 0.52 |
| EX 4 | A-1 | 80 | 0 | 0 | 1187 | 382 | 2.5 | 4.3 | 312 | 0.82 |
| EX 5 | A-2 | 50 | 0 | 0 | 683 | 352 | 1.8 | 3.8 | 163 | 0.46 |
| EX 6 | A-1 | 50 | 0 | 0 | 286 | 454 | 2.9 | 4.4 | 388 | 0.85 |
| EX 7 | A-1 | 50 | 0 | 0 | 2022 | 238 | 0.2 | 4.2 | 63 | 0.26 |
| EX 8 | A-1 | 30 | 0 | 20 | 1187 | 218 | 0.3 | 4.8 | 83 | 0.40 |
| EX 9 | A-1 | 0 | 50 | 0 | 286 | 384 | 3.5 | 5.7 | 338 | 0.88 |
| Comp. EX 1 | A-1 | 5 | 0 | 0 | 1187 | 425 | 3.8 | 4.2 | 63 | 0.15 |
| Comp. EX 2 | A-1 | 150 | 0 | 0 | 1187 | 395 | 0.4 | 6.2 | 363 | 0.92 |
| Comp. EX 3 | A-3 | 50 | 0 | 0 | 1263 | 546 | 5.5 | 4.7 | 463 | 0.85 |
| Comp. EX 4 | A-3 | 0 | 50 | 0 | 2080 | 276 | 0 | 6.5 | 38 | 0.14 |
| Comp. EX 5 | A-4 | 50 | 0 | 0 | 702 | 507 | 4.4 | 5.8 | 437 | 0.86 |
| Comp. EX 6 | A-1 | 0 | 0 | 50 | 1187 | 88 | 0 | 13 | 13 | 0.15 |
| Comp. EX 7 | A-1 | 50 | 0 | 0 | 48 | 542 | 7.0 | 4.5 | 513 | 0.95 |
| Comp. EX 8 | A-1 | 50 | 0 | 0 | 4093 | 208 | 0 | 9.7 | 38 | 0.18 |

| | Snap-Fit Property Number of Broken Elements | Self-Tapping Property cN·m | | Weld Strength MPa | Variation in Flowability (0.3 mm-Thick Flow Length) | | |
|---|---|---|---|---|---|---|---|
| | | Driving Torque | Stripping Torque | | Max Flow Length (a) mm | Min Flow Length (b) mm | (a) − (b) mm |
| EX 1 | 0 | 1 | 9 | 72 | 53 | 53 | 0 |
| EX 2 | 0 | 1 | 7 | 65 | 49 | 48 | 1 |
| EX 3 | 1 | 2 | 8 | 67 | 57 | 54 | 3 |
| EX 4 | 2 | 3 | 7 | 70 | 45 | 41 | 4 |
| EX 5 | 3 | 2 | 6 | 54 | 47 | 44 | 3 |
| EX 6 | 3 | 3 | 8 | 62 | 46 | 42 | 4 |
| EX 7 | 4 | 3 | 6 | 55 | 51 | 46 | 5 |
| EX 8 | 5 | 3 | 7 | 56 | 55 | 49 | 6 |
| EX 9 | 6 | 4 | 7 | 56 | 48 | 41 | 7 |
| Comp. EX 1 | 12 | — | 4 | 36 | 59 | 47 | 12 |
| Comp. EX 2 | 8 | 2 | 3 | 48 | 35 | 22 | 13 |
| Comp. EX 3 | 10 | 3 | 4 | 43 | 41 | 26 | 15 |
| Comp. EX 4 | 15 | 4 | 5 | 38 | 49 | 35 | 14 |
| Comp. EX 5 | 12 | 4 | 6 | 42 | 43 | 30 | 13 |
| Comp. EX 6 | 18 | 5 | 6 | 39 | 53 | 45 | 8 |
| Comp. EX 7 | 9 | 3 | 4 | 52 | 38 | 15 | 23 |
| Comp. EX 8 | 16 | 5 | 6 | 39 | 50 | 33 | 17 |

As clearly shown in Table 1, compared with the liquid crystalline polyester compositions of Comparative Examples 1 to 9, the liquid crystalline polyester compositions of Examples 1 to 8 have the more excellent snap-fit property, self-tapping property and weld strength and the less variation in flowability.

The invention claimed is:

1. A liquid crystalline polyester composition, at least containing 100 parts by weight of liquid crystalline polyester having structural units (I), (II), (III), (IV) and (V) shown below and 10 to 100 parts by weight of glass fiber, wherein
the glass fiber has a weight-average fiber length (Mw) of 200 to 500 μm and includes specific glass fiber having fiber length of not less than 1500 μm, and
content of the specific glass fiber is 0.1 to 5.0 percent by weight to a total amount of the glass fiber

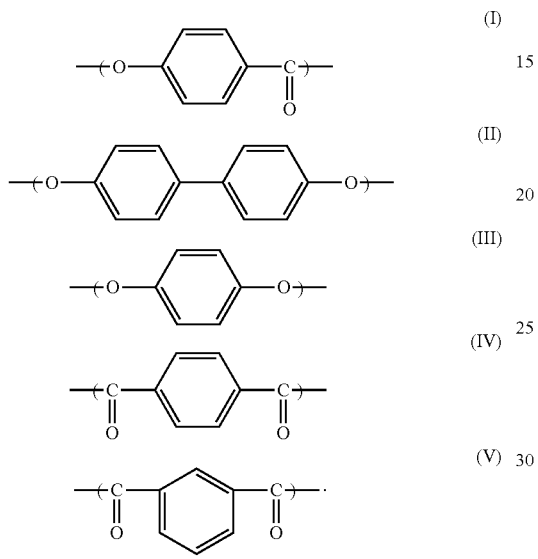

2. The liquid crystalline polyester composition according to claim 1, wherein
the glass fiber has a ratio (D90/D10) of 90%-cumulative-frequency fiber length (D90) to 10%-cumulative-frequency fiber length (D10) in the cumulative weight fiber length distribution curve of not greater than 5.0.

3. The liquid crystalline polyester composition according to claim 1, wherein the glass fiber contained in the liquid crystalline polyester composition has a mode (S) of fiber length in a fiber length frequency distribution that is not less than 0.25 times but less than 0.90 times as much as the weight-average fiber length (Mw).

4. The liquid crystalline polyester composition according to claim 1, wherein
content of the structural unit (I) is 65 to 80 mole percent relative to a total amount of the structural units (I), (II) and (III),
content of the structural unit (II) is 55 to 85 mole percent relative to a total amount of the structural units (II) and (III), and
content of the structural unit (IV) is 50 to 95 mole percent relative to a total amount of the structural units (IV) and (V).

5. A method of producing the liquid crystalline polyester composition according to claim 1 comprising:
melt-kneading at least liquid crystalline polyester having structural units (I), (II), (III), (IV) and (V) shown below and the glass fiber by an extruder having a plurality of supply ports;
supplying the liquid crystalline polyester from a first supply port located on an extruder drive system side;
supplying the glass fiber from a second supply port located downstream of the first supply port; and
controlling melt viscosity of the liquid crystalline polyester at a shear rate of 100 s$^{-1}$ in a glass fiber supply section to 100 to 5000 Pa·s

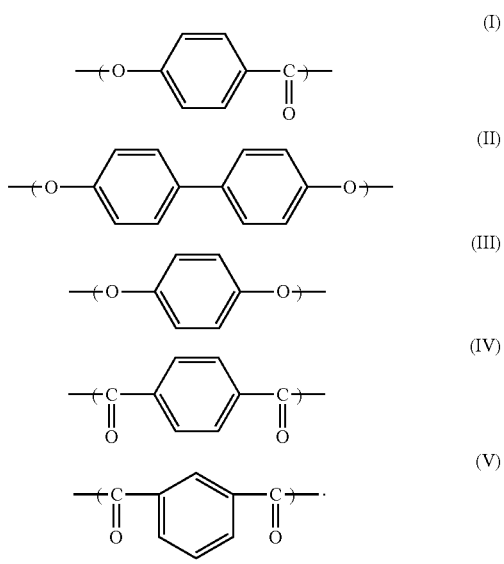

6. A molded product manufactured by injection molding the liquid crystalline polyester composition according to claim 1.

7. A connector comprising the molded product according to claim 6.

8. The liquid crystalline polyester composition according to claim 2, wherein the glass fiber contained in the liquid crystalline polyester composition has a mode (S) of fiber length in a fiber length frequency distribution that is not less than 0.25 times but less than 0.90 times as much as the weight-average fiber length (Mw).

9. The liquid crystalline polyester composition according to claim 2, wherein
content of the structural unit (I) is 65 to 80 mole percent relative to a total amount of the structural units (I), (II) and (III),
content of the structural unit (II) is 55 to 85 mole percent relative to a total amount of the structural units (II) and (III), and
content of the structural unit (IV) is 50 to 95 mole percent relative to a total amount of the structural units (IV) and (V).

10. A method of producing the liquid crystalline polyester composition according to claim 2 comprising:
melt-kneading at least liquid crystalline polyester having structural units (I), (II), (III), (IV) and (V) shown below and glass fiber by an extruder having a plurality of supply ports;
supplying the liquid crystalline polyester from a first supply port located on an extruder drive system side;
supplying the glass fiber from a second supply port located downstream of the first supply port; and
controlling melt viscosity of the liquid crystalline polyester at a shear rate of 100 s$^{-1}$ in a glass fiber supply section to 100 to 5000 Pa·s

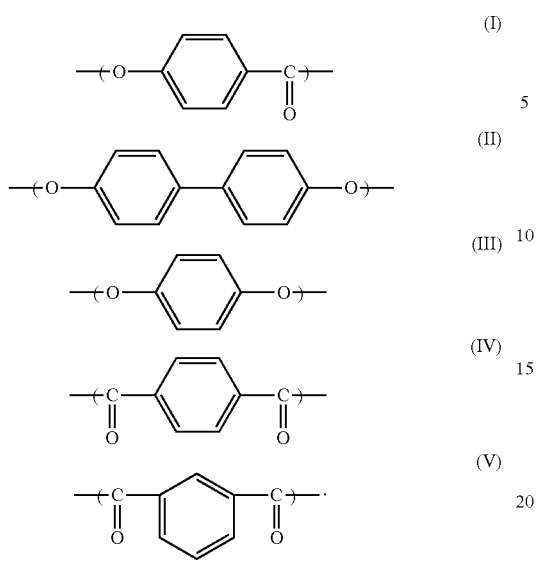
11. A molded product manufactured by injection molding the liquid crystalline polyester composition according to claim 2.
12. A connector comprising the molded product according to claim 11.
* * * * *